United States Patent Office 2,781,869
Patented Feb. 19, 1957

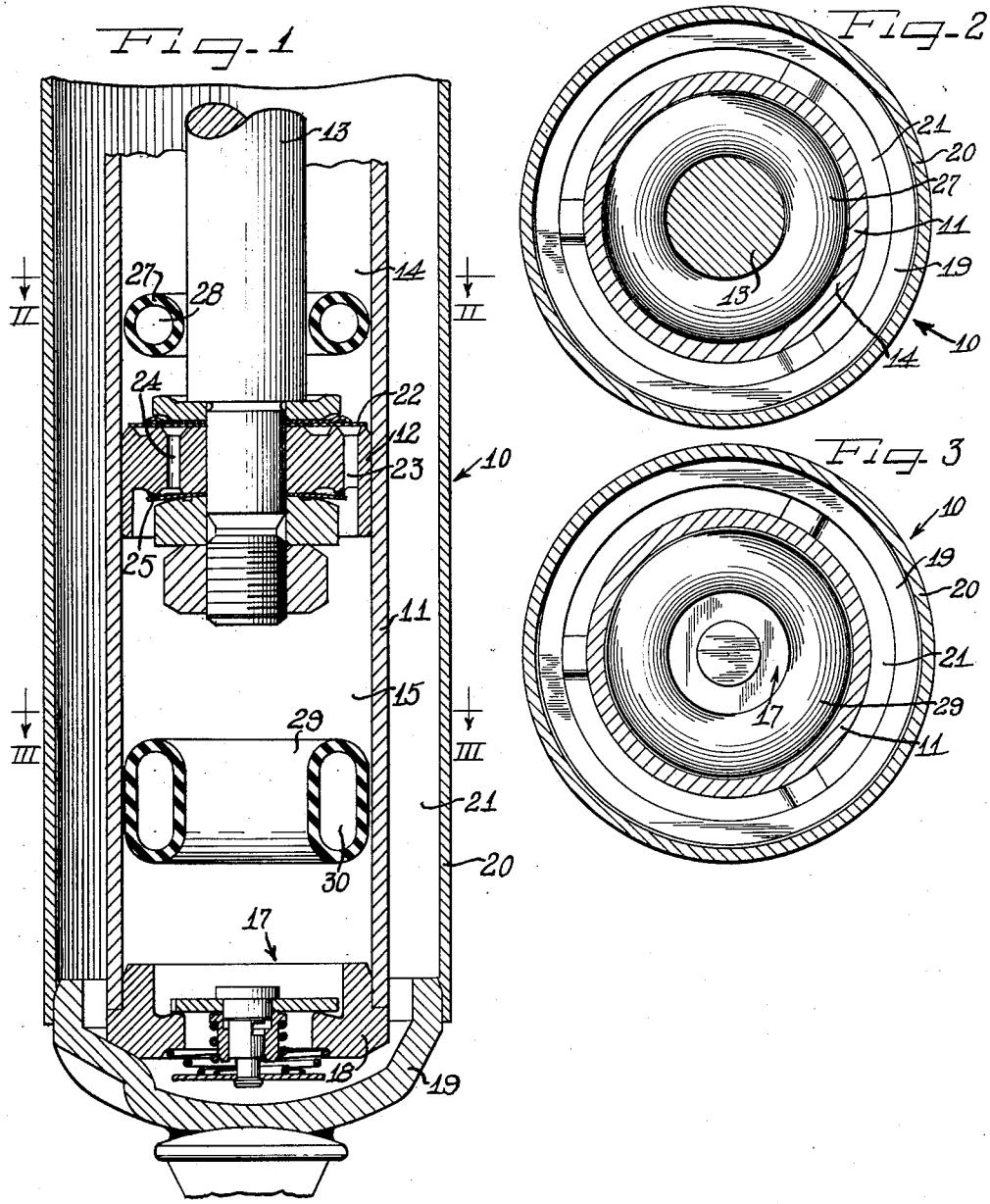

2,781,869

TELESCOPIC SHOCK ABSORBERS

Eric G. Boehm, Derby, and Carl F. Lautz, Buffalo, N. Y., assignors to Houdaille Industries, Inc., a corporation of Michigan Application March 9, 1951, Serial No. 214,782

2 Claims. (Cl. 188—88)

The present invention relates to improvements in telescopic shock absorbers and more particularly concerns improvements in such shock absorbers affording smoother operation.

One of the principal reasons for using hydraulic fluid in direct acting shock absorbers is to take advantage of the incompressibility of the hydraulic fluid. Thereby greater resistance to relative movement of the cylinder and piston portions of the shock absorbers is attained by the proper metering of the hydraulic fluid in displacement of the fluid from chamber to chamber in the shock absorber unit than where a gas or air is used in the shock absorber, with the high compressibility ratio of the gaseous fluid and generation of heat of compression. However due to the incompressibility of the hydraulic fluid, at least the initial resistance to relative movement of the piston and cylinder responsive to high magnitude or frequency shocks is such as to cause some jarring resistance. This lack of smoothness in operation under severe shock conditions is especially noticeable in passenger vehicles.

An important object of the present invention is to overcome the rough riding characteristics of hydraulic direct acting shock absorbers by the provision of pneumatic cushioning means therein.

Another object of the invention is to provide pneumatic cushioning means in direct acting hydraulic shock absorbers in such a manner as to adapt the hydraulic cushioning means to existing forms of the shock absorbers and avoid the necessity of any substantial re-designing of the shock absorber components.

A further object of the invention is to provide auxiliary cushioning means in direct acting hydraulic shock absorbers adapted to be supplied as optional equipment in such shock absorbers. Still another object of the invention is to provide in direct acting hydraulic shock absorbers small volume gaseous pockets or cells to afford compressible cushions.

Other objects, features and advantages of the present invention will be readily apparent from the following detailed description of certain preferred embodiments thereof taken in conjunction with the accompanying drawings, in which:

Figure 1 is a fragmentary diametrical sectional view through a hydraulic shock absorber embodying features of the invention;

Figure 2 is a transverse sectional view taken substantially on the line II—II of Fig. 1, and Figure 3 is a transverse sectional detail view taken substantially on the line III—III of Fig. 1.

A direct acting or telescopic shock absorber 10 embodying the invention comprises a cylinder 11 having reciprocably operable therein a piston 12 carried by the lower end portion of a piston rod 13 and dividing the interior of the cylinder into upper and lower pressure chambers 14 and 15, respectively. At its lower end the cylinder 11 is associated with a foot valve structure 17 including a cage member 18 with which the lower end of the cylinder is concentrically assembled and which in turn is maintained in assembly by the cylinder with a lower closure cap member 19 assembled with a reservoir tube or casing 20 of larger diameter and disposed concentrically about the cylinder 11 and affording a reservoir chamber 21 between the cylinder and the reservoir casing.

During what is known as the compression stroke of the piston 12, that is, when the piston travels downwardly in the cylinder 11 as viewed in Fig. 1, fluid is displaced under resistance of a spring loaded valve 22 through a series of axially extending ports 23 from the lower chamber 15 of the shock absorber into the upper chamber 14, and fluid that is displaced by the volume of the piston rod 13 in the chamber 14 escapes under resistance through the foot valve assembly 17 into the reservoir chamber 21. On rebound stroke of the piston 12, that is when the piston travels upwardly in the cylinder 11, fluid is displaced from the upper chamber 14 into the lower chamber 15 through a plurality of axial ports 24 in the piston under the resistance of a blow-off resisting spring 25, and the fluid which was displaced from the chamber 15 due to the volumetric displacement of the piston rod 13 returns into the chamber 15 from the reservoir chamber 21.

In order to provide for cushioning of the shock absorber by affording a certain or predetermined amount of "free travel" of the piston during at least the compression stroke thereof and preferably also during the rebound stroke, an air pocket or cell is provided in association with the upper chamber 14. The air cell conveniently takes the form of a tubular resilient member 27 preferably made from rubber or rubber-like material and providing a sealed air chamber 28 within which a body of air or other gas is trapped. By preference the air chamber or cell member 27 is of annular form and round tubular cross section of larger internal diameter than the diameter of the piston rod 13 so as to be accommodated freely thereabout and of smaller external diameter than the internal diameter of the cylinder 11 so as to avoid binding and so as to permit reasonably free passage of hydraulic fluid past the air cell member. By having a circular cross section for the air cell member 27, it will be apparent that pressure exerted against the exterior of the air cell member by pressure of the surrounding hydraulic fluid will be uniformly applied from all points.

Since there is pressure above the piston 12 as well as below the piston during a compression stroke, it will be apparent that a certain amount of free travel will be afforded for the piston 12 in the cylinder during both rebound and compression strokes as a result of the compression of the air within the air cell chamber 28 and consequent collapsing of the air cell member 27 in the presence of the pressure. Promptly upon release of the pressure the air cell member 27 expands to its uncompressed condition. By having the member 27 made from a resilient material, not only the compressibility and resilience of the air in the chamber 28 but also the resilience of the material in the wall of the member 27 afford cushioning values.

Where in addition to the air cell member 27 in the upper chamber 14, or alternatively to use of the air cell member 27 in the chamber 14, it is desired to provide an air cell which will operate to afford free travel of the piston 12 during the compression stroke only, an air cell member 29 may be provided in the lower chamber 15 of the shock absorber. This air chamber member may also be of generally ring or annulus form and hollow interior to provide an air chamber 30 which is filled with a preferred gaseous medium or air, under pressure if desired. As shown, the member 29 is of larger volume than the member 27, primarily because the chamber 15 usually contains a major volume of the hydraulic fluid within the shock absorber, and further because it may be desired to have more cushioning or free travel during the compression stroke. On the other hand if desired the member 29 may be of the same size or even smaller than the member 27. In any event the volumetric dimensions of the cushioning cell member 29 will be governed by the ride characteristics desired in the shock absorber. The annulus form of the member 29 and generally rounded or oval cross section affords maximum pressure responsiveness. Further, by having the air cell member 29 of annular form substantial opening is provided through the center of the annulus for free travel of hydraulic fluid through the chamber 15.

It will be observed that both of the air cell members 27 and 29 are free floating in the respective chambers 14 and 15 of the shock absorber. Thereby binding of the air cell members or interference with proper operation of the shock absorber piston 12 or of the valve structures of the shock absorber is avoided.

It will be understood that although a top closure structure is not shown in Fig. 1 at the top of the shock absorber 10 and more particularly at the top of the cylinder 11 and the reservoir casing or tube 20, such top closure structures are quite conventional and any preferred construction may be utilized not only to close the top of the shock absorber hermetically, but also to provide a bearing for the piston rod 13.

The term "air" where used herein should be construed to mean any gaseous medium, although it will be evident that in the structures disclosed herein air as such will be the usual and economically available gaseous medium for the air cell chambers.

It will be understood that modifications and variations may be effected without departing from the scope of the novel concepts of the present invention.

We claim as our invention:

1. In a direct acting hydraulic shock absorber including a cylinder inside and in spaced relation to a reservoir chamber tube, said cylinder being in valved communication at its lower end with the space between said cylinder and casing providing a reservoir, a piston dividing said cylinder into rebound stroke and compression stroke chamber portions wherein the compression stroke portion is between the piston and the valved lower end portion of the cylinder, and an air cell structure in free floating relation within said rebound stroke chamber portion above the piston and directly subjected to hydraulic fluid pressure that develops in said rebound stroke chamber portion on both the compression and rebound strokes of the piston in order to afford a predetermined amount of free travel of the piston during at least the compression stroke thereof as a result of compressibility of the air in said air cell structure.

2. In a hydraulic direct acting shock absorber, a cylinder, means providing a reservoir chamber in restricted communication with said cylinder, a piston operable in said cylinder and dividing the same into upper and lower chambers and having a piston rod extending concentrically through the upper chamber, means permitting restricted flow of pressure fluid past said piston, and an annular cushioning air cell member of compressible structure in free floating relation in the lower chamber below the piston and having an inner diameter of substantial dimension affording a large open passage therethrough for movement of pressure fluid therethrough in the operation of the piston in the cylinder, said cell member having an outer diameter substantially as large as said cylinder to prevent its canting within the cylinder as pressure fluid flows through said passage during flow of pressure fluid between said cylinder and said reservoir chamber and during flow of pressure fluid past said piston.

References Cited in the file of this patent
UNITED STATES PATENTS

| | | |
|---|---|---|
| 2,314,404 | Katcher | Mar. 23, 1943 |
| 2,334,708 | Joy | Nov. 23, 1943 |
| 2,392,387 | Joy | Jan. 8, 1946 |
| 2,410,176 | Magrum | Oct. 29, 1946 |
| 2,451,171 | Mullen | Oct. 12, 1948 |
| 2,521,074 | Marston | Sept. 5, 1950 |
| 2,571,279 | Myklestad | Oct. 16, 1951 |
| 2,701,714 | Harwood | Feb. 8, 1955 |

FOREIGN PATENTS

| | | |
|---|---|---|
| 296,897 | Great Britain | Sept. 13, 1928 |
| 315,917 | Great Britain | July 22, 1929 |